United States Patent [19]
Handtmann

[11] Patent Number: 5,498,332
[45] Date of Patent: Mar. 12, 1996

[54] PRECOATING HEAD

[76] Inventor: Thomas Handtmann, Hugo-Häring-Strasse 60, Biberach, Germany

[21] Appl. No.: 214,822
[22] Filed: Mar. 16, 1994
[30] Foreign Application Priority Data Mar. 23, 1993 [DE] Germany .............................. 9304391 U

[51] Int. Cl.$^6$ ............................ B01D 37/02; B01D 24/40
[52] U.S. Cl. ............................................. 210/193; 210/456
[58] Field of Search ....................................... 210/232, 238, 210/456, 777, 778, 193, 289, 291, 421, 446

[56] References Cited

U.S. PATENT DOCUMENTS

| | | |
|---|---|---|
| 2,073,991 | 3/1937 | Koser . |
| 2,428,082 | 9/1947 | King . |
| 2,665,009 | 1/1954 | Harstick . |
| 2,754,005 | 7/1956 | Tursky . |
| 2,784,843 | 3/1957 | Braunlich . |
| 3,117,233 | 1/1964 | Mittelberger . |
| 3,208,595 | 9/1965 | Butler . |
| 3,272,340 | 9/1966 | Hungerford . |
| 3,360,131 | 12/1967 | Witkowski . |
| 3,373,875 | 6/1968 | Krikorian . |
| 3,459,302 | 8/1969 | Ross . |
| 3,720,316 | 3/1973 | Riesbeck . |
| 3,935,110 | 1/1976 | Schmidt . |
| 4,136,029 | 1/1979 | Cosack . |
| 4,165,283 | 8/1979 | Weber . |
| 4,170,056 | 10/1979 | Meyst . |
| 4,179,381 | 12/1979 | Baur . |
| 4,231,665 | 11/1980 | Shelton . |
| 4,288,325 | 9/1981 | Lieberman . |
| 4,427,547 | 1/1984 | Miller . |
| 4,664,812 | 5/1987 | Klein . |
| 4,944,876 | 7/1990 | Miller . |

FOREIGN PATENT DOCUMENTS

| 2072429 | 11/1970 | France . |
|---|---|---|
| 984997 | 4/1963 | United Kingdom . |

OTHER PUBLICATIONS

Permutit—Pressure Filters Bullitin No 2225-D.

Primary Examiner—Thomas M. Lithgow
Attorney, Agent, or Firm—Tilton, Fallon, Lungmus & Chestnut

[57] ABSTRACT

The present invention relates to precoating head for forming a filter cake in a filter carrier, with the precoating head comprising an inlet nozzle for the filter aid and a deflection element arranged below the opening of the inlet nozzle for deflecting the flow of filter aid.

To obtain a uniform filter cake structure, a distributor grid is arranged in spaced-apart relationship with the deflection element according to the invention.

5 Claims, 1 Drawing Sheet

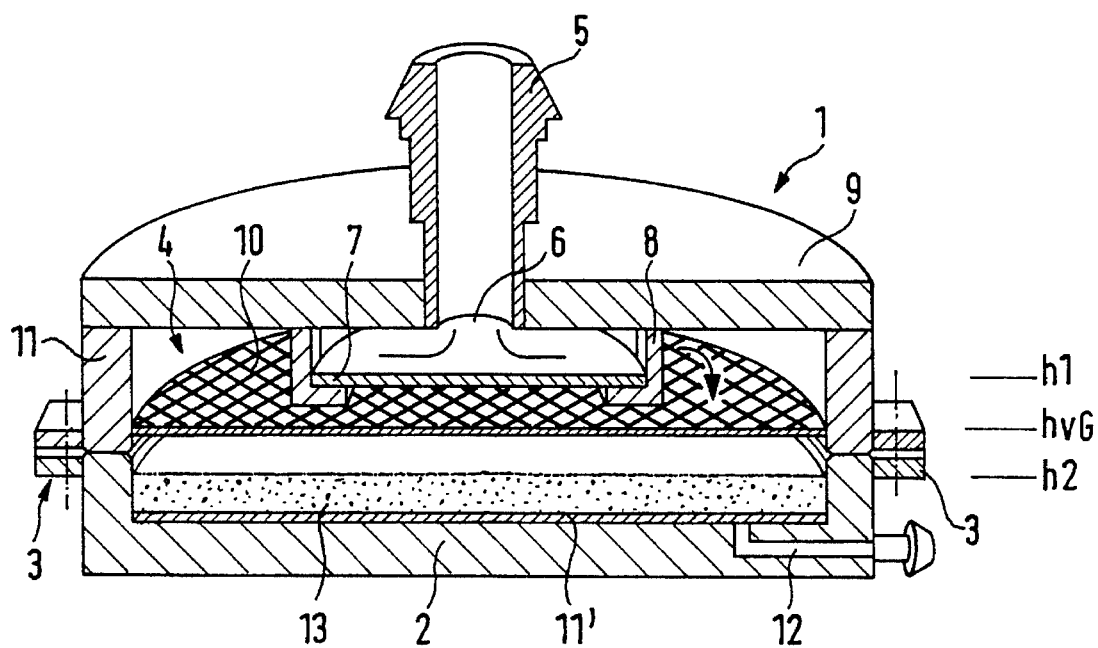

PRECOATING HEAD

BACKGROUND AND SUMMARY

The present invention relates to a precoating head for forming a filter cake in a filter carrier, said precoating head comprising an inlet nozzle for the filter aid and a deflection element arranged below the opening of the inlet nozzle for deflecting the flow of filter aid.

WP 93/901 46 discloses a filtering method and a filter device for filtering liquids, wherein the filter cake is first produced in a precoating station within a filter carrier. The carrier is then moved from the precoating station with the filter cake formed therein into a filter in which a plurality of filter carriers are stacked up in tower-like configuration and pressed with one another. Such a filter tower can, e.g., be used for filtering liquids, such as beer or the like.

To achieve a uniform precoating of the filter cake in the precoating station, i.e. a uniform structure of the filter cake with a substantially uniform height, the filter aid, such as kieselguhr, is introduced into a water current via an inlet nozzle on a precoating head of the precoating station and, after having passed through the inlet nozzle, is deflected with the aid of a deflection element in such a manner that it is distributed in the interior of the precoating head above the filter carrier in which the filter cake is to be produced.

It has however been found that a distribution with the aid of a deflection element does not always guarantee the formation of a uniform filter cake, especially on account of resultant swirls which create small craters inside the filter cake that are not desired.

It is therefore the object of the present invention to develop a precoating head of the above-mentioned type in such a manner that a uniform filter cake is formed.

This object is attained with a precoating head of the above-mentioned type in that a distributor grid is arranged in spaced-apart relationship with the deflection element.

It has been found that a distributor grid which is arranged between filter cake and inlet nozzle effects an interruption of the swirls and ensures a very uniform distribution of the liquid containing the filter aid and thus a uniform structure of the filter cake.

The mesh width of the distributor grid depends on the composition of the filter aid, but is between 3 and 12 mm at a wire thickness of from 0.5 to 2 mm when standard kieselguhr preparations are used. The mesh width is always chosen such that the filter aid parts are prevented from settling on the grid.

To accomplish easy cleaning of the distribution grid and to make it replaceable by grids of different mesh widths in response to the respectively intended use, the distribution grid is preferably secured to the side walls of the precoating head in a detachable manner.

BRIEF DESCRIPTION OF THE DRAWINGS

The invention shall now be explained and described in more detail with reference to the embodiment shown in the drawing.

The sole FIGURE is here a perspective, simplified sectional view of the structure of a precoating head of the invention.

DETAILED DESCRIPTION OF THE PREFERRED EMBODIMENT

The drawing depicts a precoating head designated by 1 on the whole, which is mounted on a filter carrier 2. Filter carrier 2 is connected to precoating head 1 in a suitable manner via holding means 3 in such a manner that the precoating head forms a closed inner chamber 4 together with filter carrier 2. The precoating head and the carrier have a circular shape. An inlet nozzle 5 via which the filter aid contained in a fluid, such as water, can flow into the inner chamber 4 is centrally arranged in the center of precoating head 1. A circular deflection element 7 which is held via suitable holding means 8 on a cover 9 of the precoating head is located below the opening 6 of inlet nozzle 5 in spaced-apart relationship. The inflowing filter aid is here deflected in accordance with the arrows drawn and is distributed substantially over the edge of the deflection element and flows from there downwards onto distributor grid 10. The distributor grid is suitably mounted in a detachable manner on the inner wall 11 of the precoating head. The mesh width of the distributor grid depends on the composition of the filter aid, but is normally between 3 and 12 mm for kieselguhr. The wire thickness is between 0.5 and 2 mm. The liquid including the filter aid passes through distributor grid 10. The filter aid is now retained by a fine mesh fabric 11 on the bottom of the filter carrier 2 on the mesh-fabric while the liquid can flow through the mesh fabric 11 and then leaves the filter carrier in the known manner via one or a plurality outlets 12. Filter cake 13 is then formed on mesh fabric 11.

The distributor grid which is arranged halfway hvG between height h1 of deflection element 7 and the maximum height h2 of the filter cake interrupts the flow from the deflection element into the filter carrier chamber and ensures a very uniform distribution of the filter aid, so that a uniform filter cake can be formed on the whole without the formation of craters.

I claim:

1. A precoating head assembly for forming a filter cake from a filter aid in a filter carrier, comprising:

a precoating head having a peripheral inner wall;

inlet nozzle means connected to said precoating head for introducing a filter aid into said precoating head, said inlet nozzle means including an opening;

a source of filter aid in communication with said inlet nozzle means;

deflector means located below said opening for deflecting said filter aid; and distributor grid means arranged below said deflector element means for distributing said filter aid to form a substantially uniform filter cake in a filter carrier, said filter carrier being sized to retain said filter aid in the form of a filter cake.

2. A precoating head assembly according to claim 1 in which said distributor grid means includes a mesh grid defining a plurality of mesh openings which are sized so that said filter aid will not settle on said mesh grid.

3. A precoating head assembly according to claim 2 in which a width of said mesh openings is between about 3 and 12 mm.

4. A precoating head assembly according to claim 1 in which said mesh grid is formed of wire having a thickness of approximately 0.5 to 2 mm.

5. A precoating head assembly according to claim 1 in which said distributor grid means is detachably disposed on said inner wall of said precoating head.

* * * * *